(12) United States Patent
Quraishi et al.

(10) Patent No.: US 8,494,948 B2
(45) Date of Patent: Jul. 23, 2013

(54) RULES ENGINE HAVING USER ACTIVATED RULES OF SELECTABLE SCOPE AND SELECTABLE OUTCOMES

(75) Inventors: Syed K. Quraishi, Edison, NJ (US); Morgan C. Hamm, Edison, NJ (US); Jorge Alfonso, West Caldwell, NJ (US); Claire H. Santaniello, Milford, NJ (US)

(73) Assignee: Pershing Investments, LLC, New York, NY (US)

( * ) Notice: Subject to any disclaimer, the term of this patent is extended or adjusted under 35 U.S.C. 154(b) by 2062 days.

(21) Appl. No.: 09/827,333

(22) Filed: Apr. 6, 2001

(65) Prior Publication Data

US 2003/0167219 A1 Sep. 4, 2003

(51) Int. Cl.
 *G06Q 40/00* (2012.01)
(52) U.S. Cl.
 USPC .................. 705/37; 705/36 R; 705/26; 705/1; 379/88
(58) Field of Classification Search
 USPC ...................................................... 705/35, 37
 See application file for complete search history.

(56) References Cited

U.S. PATENT DOCUMENTS

| | | | | |
|---|---|---|---|---|
| 4,554,418 A | * | 11/1985 | Toy ............................. | 379/88.01 |
| 4,674,044 A | * | 6/1987 | Kalmus et al. ................... | 705/37 |
| 5,101,353 A | | 3/1992 | Lupien et al. | |
| 5,732,397 A | * | 3/1998 | DeTore et al. ................. | 705/1.1 |
| 5,819,238 A | | 10/1998 | Fernholz | |
| 5,978,779 A | * | 11/1999 | Stein et al. ....................... | 705/37 |
| 6,014,643 A | * | 1/2000 | Minton ....................... | 705/36 R |
| 6,018,721 A | * | 1/2000 | Aziz et al. .................... | 705/36 R |
| 6,850,907 B2 | * | 2/2005 | Lutnick et al. .................. | 705/37 |
| 2003/0033212 A1 | * | 2/2003 | Sandhu et al. .................. | 705/26 |
| 2008/0120129 A1 | * | 5/2008 | Seubert et al. .................... | 705/1 |

FOREIGN PATENT DOCUMENTS

| | | |
|---|---|---|
| JP | 3-068067 A | 3/1991 |
| JP | 11-053182 A | 2/1999 |
| JP | A-11-185109 | 7/1999 |
| WO | WO 97/22075 | 6/1997 |
| WO | WO 00/16224 | 3/2000 |

OTHER PUBLICATIONS

V. Stamas, "Brokers may face mandatory job skills training", Public Finance Watch ,Sep. 20, 1993, vol. 7, No. 35, p. 9.
J. Michaels, "Buy side champions alternative trading systems", Wall Street & Technology, Jun. 1993, vol. 10, No. 11, pp. 38-48.
English Translation of Japanese Office Action issued in Japanese Patent Application No. JP 2001-575332 dated Aug. 12, 2010.
Chinese Office Action, w/ English translation thereof, issued in Chinese Patent Application No. CN 01807362X dated Nov. 6, 2009.

(Continued)

*Primary Examiner* — Siegfried E Chencinski
(74) *Attorney, Agent, or Firm* — McDermott Will & Emery LLP

(57) ABSTRACT

Orders for execution of securities transactions and requests for asset movement are screened by a rules engine and may be automatically approved. The rules engine has rules which are user configurable. The rules may be configured to provide different outcomes, to provide a user selectable scope of application and to provide user selectable parameters. A transaction is processed against the rule set applicable thereto in order of increasing scope of the rules. That is, rules applicable to the account level are processed before rules applicable to the registered representative, office or firm. Individual broker-dealer firms may each configure rules applicable to their own firms independently of rules applicable to any other firm serviced by the rules engine.

20 Claims, 9 Drawing Sheets

OTHER PUBLICATIONS

Chinese Office Action issued in Chinese Patent Application No. CN 01807362X dated May 8, 2009.
English Translation of Chinese Office Action issued in Chinese Patent Application No. CN 01807362X dated Nov. 21, 2008.
European Office Action issued in European Patent Application No. 01 924 747.7-2221, dated Oct. 30, 2007.
European Office Action issued in European Patent Application No. 01 924 747.7-2221, dated Apr. 10, 2006.
European Search Report issued in European Patent Application No. EP 01924747.7-2221, dated Feb. 8, 2006.
Korean Office Action issued in Korean Patent Application No. 10-2002-7013429, dated Nov. 24, 2006.
Korean Office Action issued in Korean Patent Application No. 10-2002-7013429, dated Jun. 27, 2007.
Official Action dated Apr. 8, 2011 for Japanese Patent Application No. 2001-575332.

* cited by examiner

EXAMPLE:

| NUMBER | TYPE | POSSIBLE LEVEL(S) | POSSIBLE OUTCOME(S) |
|---|---|---|---|
| 1011 | MANDATORY | FIRM | STOP |

THIS RULE STOPS AN ORDER FOR AN ACCOUNT THAT IS CLOSED.

FIG. 3A

EXAMPLE:

| NUMBER | TYPE | POSSIBLE LEVEL(S) | POSSIBLE OUTCOME(S) |
|---|---|---|---|
| 1141 | OPTIONAL | FIRM<br>OFFICE<br>INVESTMENT PROFESSIONAL<br>ACCOUNT | STOP<br>APPROVAL<br>WARNING<br>ACCEPTANCE |

THIS RULE INDICATES THAT AN ORDER HAS BEEN PLACED WHICH EXCEEDS A CREDIT LIMIT PARAMETER

| G8E6 | | | | RULES ASSIGNMENT DEFINITION | 01/29/99 | 10:21 |
|---|---|---|---|---|---|---|
| FUNCTION: RAMN CORR: 40V | | | | ACCOUNT: ___ ___ DATA: ___ | NEXT: ___ | |
| MORE PAGES AVAILABLE | | | | | | |
| RR: ___ | | | | | PAGE 1 OF 2 | |
| ACT | INHERITED RULE | OUT COME | RULE CODE | RULE DESCRIPTION | PARM IND | GROUP ID |
| ---- | --------- | ---- | ---- | ------------------------------------ | ---- | ----- |
| P | P | S | 1011 | ACCOUNT CLOSE CHECK | | |
| P | P | S | 1012 | ACCOUNT TRANSFER CHECK | | |
| P | P | S | 1013 | ACCOUNT PENDING CLOSE | | |
| P | P | A | 1014 | OPTION EXPIRATION | | |
| P | P | A | 1017 | ADOPION AGREEMENT | | |
| P | P | S | 1018 | MARGIN ORDER IN RETIREM | | |
| P | P | S | 1019 | SHORT SALE IN RETIREMEN | | |
| P | P | A | 1052 | OPTION PAPARS OF FILE | | |
| Y | | A | 1080 | EQUITY SELL | | |
| Y | | A | 1081 | EQUITY BUY TO COVER RUL | | |
| Y | | A | 1082 | SELL TO CLOSE RULE | | |
| Y | | A | 1083 | SELL TO OPEN RULE | | |
| Y | | A | 1084 | BUY TO CLOSE RULE | | |
| | | A | 1085 | EQUITY SHORT SALE | | |
| P | P | A | 1101 | MARGIN PAPERS | | |

1=HELP 3=PREV 4=SAVE 5=CANCEL 7=BACK 8=NEXT 9=RULE CODE 10=RULE PARM 12=MENU

FIG. 6

```
12345678901234567890123456789012345678901234567890123456789012345678901234567890
 G8E6                     RULE CODE DEFINITION              02/22/99 10:08
 FUNCTION: RCOD  CORR: ____     ACCOUNT: ____ _____ DATA: _____ NEXT: ____
 RULE CODE DISPLAYED

RULE CODE            : 1141    (NUMERIC)
 CATEGORY CODE        :         (SY/P/PS OR SPACE)
 OUTCOME              : A       (W/S/A/D)
 PARM INDICATOR       : Y       (Y/N)
 GROUP ID             : ____    (NUMERIC)
 RULE DESCRIPTION     : TRADING LIMIT RULE BY DOLLAR AMOUNT

RULE MESSAGE         : TRADING LIMIT EXCEEDED

PF: 1=HELP  3=PREVIOUS  4=UPDATE  5=CANCEL  7=BACK  8=FORWARD  12=MENU
```

FIG. 7

```
12345678901234567890123456789012345678901234567890123456789012345678901234567890
```
| G8E6  |         | RULE PARAMETER |     | 02/22/99 | 10:11 PAGE: 01 |
| FUNC: ____ | CORR: ____ | ACCT: ____ ____ | RR: ____ | DATA: ____ | |

RULE CODE: 1141    TRADING LIMIT RULE BY DOLLAR AMOUNT

|                | EQUITY  | MUTUAL-FUNDS | OPTION | FIXED-INCOME |
|----------------|---------|--------------|--------|--------------|
| PRCPL AMT - CUS | 10000  | 50000        | 10000  | 100000       |
| PRCPL AMT - BKR | 100000 | 100000       | 50000  | 250000       |

PF: 1=HELP    3=PREVIOUS    4=UPDATE    5=CANCEL    7=LEFT    8=RIGHT

FIG. 8

RULES ENGINE HAVING USER ACTIVATED RULES OF SELECTABLE SCOPE AND SELECTABLE OUTCOMES

CROSS REFERENCE TO RELATED APPLICATIONS

This invention disclosed herein is related to and claims priority from co-pending U.S. Provisional Patent Application Ser. No. 60/195,196 filed Apr. 7, 2000 by inventors Syed K. Quraishi et al. and entitled RULES BASED ORDER PROCESSING, which is hereby incorporated herein in its entirety by reference.

COMPUTER PROGRAM LISTING APPENDIX

A computer program listing Appendix is included on a CD-ROM, the contents of which, including several files, are hereby incorporated herein in their entirety. A description of the files contained on the CD-ROM is given in paper Appendix A attached to the specification.

BACKGROUND OF THE INVENTION

1. Field of the Invention

The invention disclosed herein relates to computer systems and, more particularly, to rules-based systems for order execution and asset movement processing.

2. Description of Related Art

In the securities industry, the traditional approach to placing orders is for a customer to call his stock broker who, typically, is associated with a broker-dealer firm which has personnel or connections with personnel on the floors of various trading exchanges. The customer's order is reviewed by the registered representative with whom he works and a plurality of reviews take place within the registered representative's firm prior to forwarding the customer's order to a specialist on the floor of an appropriate exchange for execution.

Recently, a number of on-line trading companies have been formed which permit customers to utilize their personal computers to place orders for execution over a network, such as the internet.

In the field of artificial intelligence, rules based systems are known in which one or more conditions trigger a rule *resulting in a desired outcome for the condition(s) presented.

There are a number of problems associated with the techniques of the prior art. First, the regulatory environment of securities trading is extremely complex and changes rapidly. Different security firms have different environments and different policies for implementing compliance with regulatory requirements. When market conditions are good, hiring of registered representatives occurs rapidly creating an immediate training problem. When market conditions are bad, downsizing results in reallocation of responsibilities which may also require new training for particular individuals who survive the downsizing. As in any environment in which large amounts of money are involved, there is always a potential for fraud.

BRIEF SUMMARY OF THE INVENTION

The problems of the prior art are overcome, in accordance with the invention, by providing techniques for automating the handling process for customer orders and asset movement requests, especially in the securities industry.

This is accomplished, in accordance with the invention, by providing a rules engine which is designed and configured (1) to prevent problems in the order handling, approval and execution processes, (2) to ensure compliance with regulatory requirements, (3) to enforce diverse policies for different broker-dealer firms using the rules engine and to allow broker-dealer firms to flexibly tailor, in real time, their own policies appropriate to various levels of administrative hierarchy within the firm.

The foregoing and other features, aspects and advantages of the present invention will become more apparent from the following detailed description of the present invention when taken in conjunction with the accompanying drawings.

BRIEF DESCRIPTION OF THE DRAWINGS

The object, features and advantages of the system of the present invention will be apparent from the following descriptions, in which:

FIGS. 3A and 3B describe exemplary rule formats in accordance with one aspect of the invention.

FIG. 6 is an exemplary rules assignment definition screen.

FIG. 7 is an exemplary rule code definition screen.

FIG. 8 is an exemplary parameter screen for rules generated by the screen shown in FIG. 7.

DETAILED DESCRIPTION OF THE INVENTION

Figure 1:
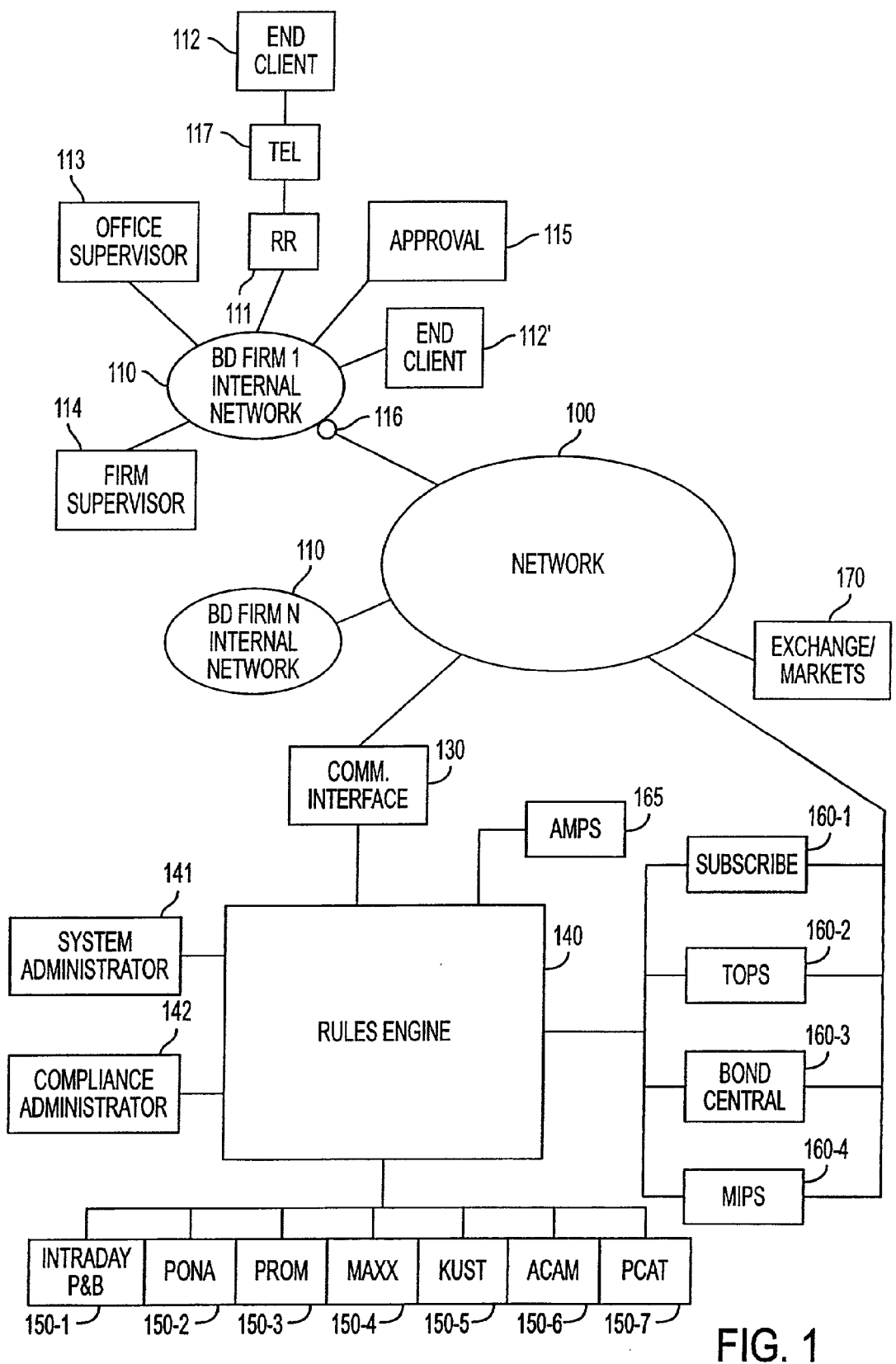
FIG. 1 is a diagram of an order management system in accordance with one aspect of the invention.

FIG. 1 is a diagram of an order approval system in accordance with one aspect of the invention. A network 100 interconnects a plurality of broker-dealer firm internal networks 110 with rules engine 140 over communications interface 130. The rules engine 140, in this example, services a plurality of different firms each with their own diverse policies and culture. A typical broker-dealer firm has a plurality of registered representatives 111 which communicate with customers 112. In some circumstances, assistants to the registered representative or support desks will be accessing the broker-dealer network to assist in placement of orders or asset movement requests from customers.

A broker-dealer firm may have a plurality of offices, each with an office supervisor 113. At the firm level, there might also be supervisory personnel 114 responsible for all offices. Typically, when firm policy dictates, certain transactions will be forwarded to an approval desk 115 for approval prior to being forwarded to a specialist on the floor of an exchange for execution.

The internal network 110 associated with a broker-dealer firm has a gateway 116 which serves as an interface to the larger network 100. Rules engine 140 may operate in a service bureau model to service a plurality of broker-dealer firms or, alternatively, the rules engine 140 can be operated internally within a single broker-dealer firm for automating the processing of orders within that firm.

Typically, the rules engine 140 will have a systems administrator 141 which will have total access to all security levels of the rules engine system. A compliance administrator 142 may service all broker-dealer firms or, alternatively, each broker-dealer firm may have an individual compliance administrator.

A plurality of databases, 150-1, 150-2, 150-3, 150-4, 150-5, 150-6 and 150-7 in this example, provide information utilized by the rules engine in carrying out order or asset management automation. The intra-day PNB database 150-1 maintains position and balance information, such as account activity occurring during a trading day, so that current information is always available to the rules engine. The PONA database 150-2 is an on-line database of names and addresses of account holders. The PROM database 150-3 is a market product master database which maintains up to date information on each security that might be subject to an order submitted to the rules engine 140 or a trade approved by the rules engine. It obtains current information over the network 100 on an ongoing basis. The MAXX database 150-4 is a position and balance database which is updated at the end of each trading day. The KUST database 150-5, is a documentation database indicating whether certain forms are on file for a particular customer. An example of such forms would be a margin agreement signed by the customer. If such an agreement were in the files, the KUST database would reflect this fact. The ACAM database 150-6 is a reference to the cash available in a particular customer's account. The PCAT reference database contains indications that an account is in a mode of transfer between broker-dealers.

A number of order execution processes 160, are available to receive approved orders for transactions in respective types of securities from the rules engine 140. The SUBSCRIBE order execution system 160-1 handles transactions in annuities. The TOPS order execution system 160-2 handles approved orders for equities and options and may execute transactions on a plurality of exchanges, 170. The MIPS order execution and processing system 160-4 handles mutual funds transactions. The AMPS process 165 carries out transfers of funds from one account to another in response to a request from a broker-dealer firm.

Following an exemplary order, end client 112 would telephone his registered representative 111 using an available telephone system 117 and place an order. The registered representative is associated with a Broker-Dealer firm #1 (110) which forwards the order over network 100 and through communications interface 130 to rules engine 140 for validation. The validation process is described more in detail hereinafter. Using information from the databases 150, the rules engine will take the actions described hereinafter. One of those actions may be automatic approval of an order for processing by sending to an exchange or market for execution. If that is the case, the rules engine forwards the order to a selected one of the order execution process 160 to be forwarded over the network 100 to an exchange or a market 170 for execution. The results of the execution are returned and incorporated into the databases. The end client may be an individual or an institution. Some end clients 112' may connect directly or indirectly to the broker-dealer network without going through a registered representative.

An end client 112 or 112' may have several accounts and may, on occasion, request a transfer of assets from one account to another. The request is forwarded to the rules engine 140 and, if the request is approved after being subjected to rules analysis, the transfer will be carried out using AMPS process 165.

The rules engine may also service clients 120 which may be an individual or an institution.

Figure 2:
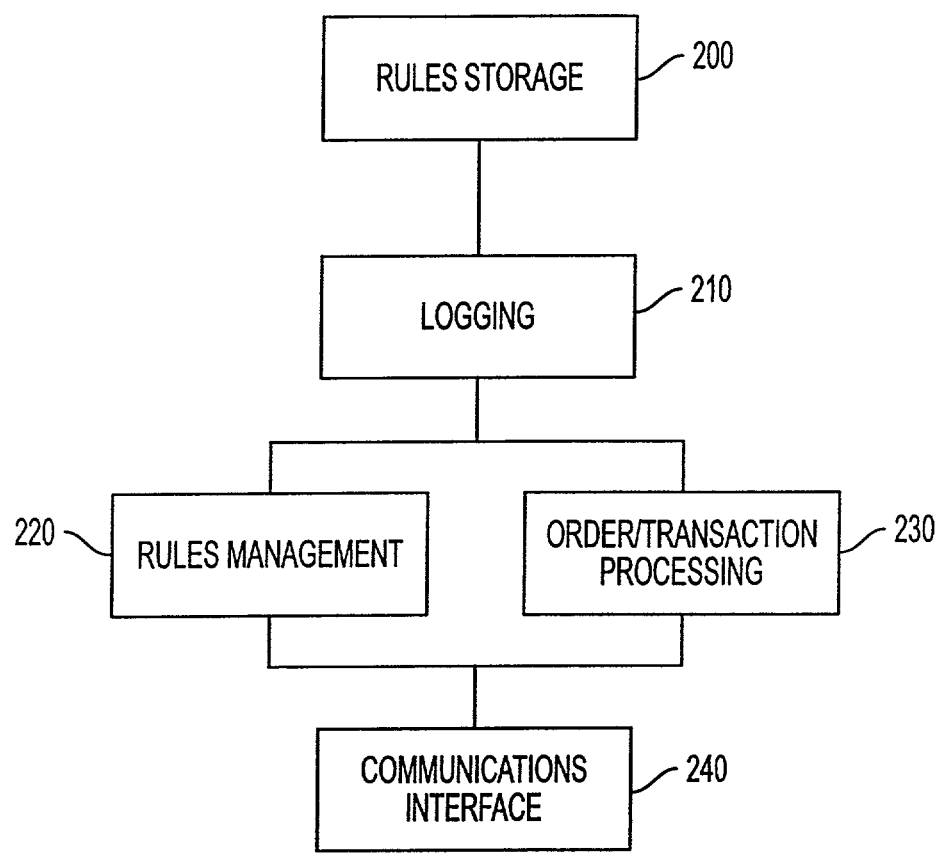
FIG. 2 is a diagram of a rules engine in accordance with one aspect of the invention.

FIG. 2 is a diagram of a rules engine in accordance with one aspect of the invention. Rules storage 200 is an area of memory where the individual rules are stored for use in evaluation of submitted orders and other transaction requests. Any change to the rules in recorded in a logging process 210. The logging process permits a variety of reports to be generated and permits restoration of a database which has failed or become corrupted based on a previous backup of the rules from rule storage.

A rules management process 220, described more hereinafter, enables rules to be created and modified on a real-time basis, and viewed by authorized users interacting with the rules engine, typically over a communications interface. Order/transaction processing 230 permits orders or transactions received over the communications interface 240 to be subjected to application of the rules that relate to accounts, registered representatives, offices and the broker-dealer firm from which the order originates.

The rules engine selectively produces the following audit reports.

A rules assignment report lists the riles assigned or unassigned at each applicable level of the correspondent broker-dealer firm. The levels include account, investment professional (registered representative) office and firm. It lists any changes made to the rules engine assignment for the broke-dealer firm as well as the personal identification of the individual who made the change.

A rules log file lists any changes made with reference to the rules assignment. The report reflects the level of assignment before and after the change as well as the personal identification of the individual who made the change and when the change was made.

A daily order log documents an audit trail for orders that are approved by the rules engine, as well as those orders that have not been approved. This reports details the funds available in the client's account at the time an order was placed if it is an opening transaction and details the available position if it is the closing transaction.

An order processing and execution log details pertinent information for orders processed by the rules engine that were sent to a particular order and execution unit 160 for execution. This log details whether the rules engine automatically approves the order. It also details whether the order required additional approval because it failed one or more rules, and lists the rules that may have been violated as well. If the order is manually approved, the report will indicate the user ID of the individual who approved the order.

FIGS. 3A and 3B describe exemplary rule formats in accordance with one aspect of the invention. FIG. 3A illustrates an example of a rule which stops an order for an account that has been closed. This example shows the number of the rule, the type of the rule, the possible levels at which the rule can be applied, and the possible outcomes that are available to the rule. Other fields are typically used with the rule. This rule is very simplistic and does not have the flexibility that the rule shown in FIG. 3B has.

The rule shown in FIG. 3B is a rule which indicates that an order has been placed which exceeds the credit limit parameter set by the particular broker-dealer firm. It, too, shows a rule number (1141) a rule type but here, four possible levels for application of the rule can be set. A particular level reflects a varying scope of application from the very narrow account level to the broadest application of the rule, namely the firm level. In addition to being able to specify a scope of application for this exemplary rule 1141, it is also possible to selectively change the outcome associated with the rule by selecting one or more possible outcomes shown here. In some embodiments, the acceptance outcome is a default that occurs when no active rules are violated.

As noted above, the scope of a particular rule can be set to be applicable only to a particular account, to a particular registered representative, to a particular office of a broker-dealer firm or to the broker-dealer firm itself. That is, for a particular level, the scope of the rule would be applied to all transactions, originating from that account, registered representative, office or firm, depending upon the scope selected.

It is convenient to group sets of rules into distinct categories. Examples of such categories include account status, account restriction, documentation, factor, margin, options, order size, position and balances, registration, retirement, stockwatch, trade restriction, security restriction and suitability.

The application of a particular rule, such as shown in FIG. 3B, can have outcomes specified by a user. In this example, possible outcomes include stop, send to approval queue, provide warning message, and accept. For example, as discussed in conjunction with FIG. 3A, an order based on a closed account should be stopped. If one were to hire a new registered representative, one might want to review all of his orders by having them sent to an approval queue in advance. Such a rule could be set to have that outcome and would preferably be set at the registered representative level. As another example, if a particular account were to place an order and the resources of that account have been exhausted, a warning message might be appropriate based on a particular parameter provided for that account. This outcome would be, in this example, applied at the account level. Finally, if all rules applicable to a particular order or transaction are satisfied with no reservations, the transaction would be accepted and processed for execution.

Considering parameters, examples of parameters that might be associated with a particular rule would be a trading limit by either dollar amount as a parameter or a quantity of securities purchased as a parameter. Similarly, an order for purchase of securities might be checked against the firm's watch list to see if a warning message should be posted. As another example, there might be a dollar limit for the purchase of low-priced securities. Each of these parameters can be associated with a particular rule at any particular level.

A complete set of rules, as currently implemented, are contained in the CD-ROM attached as Appendix A to this specification.

A worksheet may be conveniently used for a particular scope (account, registered rep, office or firm) listing each of the rules with number, rule name, comments, rule type (optional or mandatory), default outcome and check boxes for permitted outcomes and blanks for entry of parameters, to assist broker-dealers in setting up the rules.

The rule management process 220 will now be addressed in more detail. The normal security measures associated with any computer system are available. Access partitions are enforced so that one broker-dealer firm cannot access the information from another. Within a broker-dealer firm, access is limited by user ID to those functions that are appropriate to that user. When a new broker-dealer firm is brought into the system, a number of steps occur.

Figure 4:
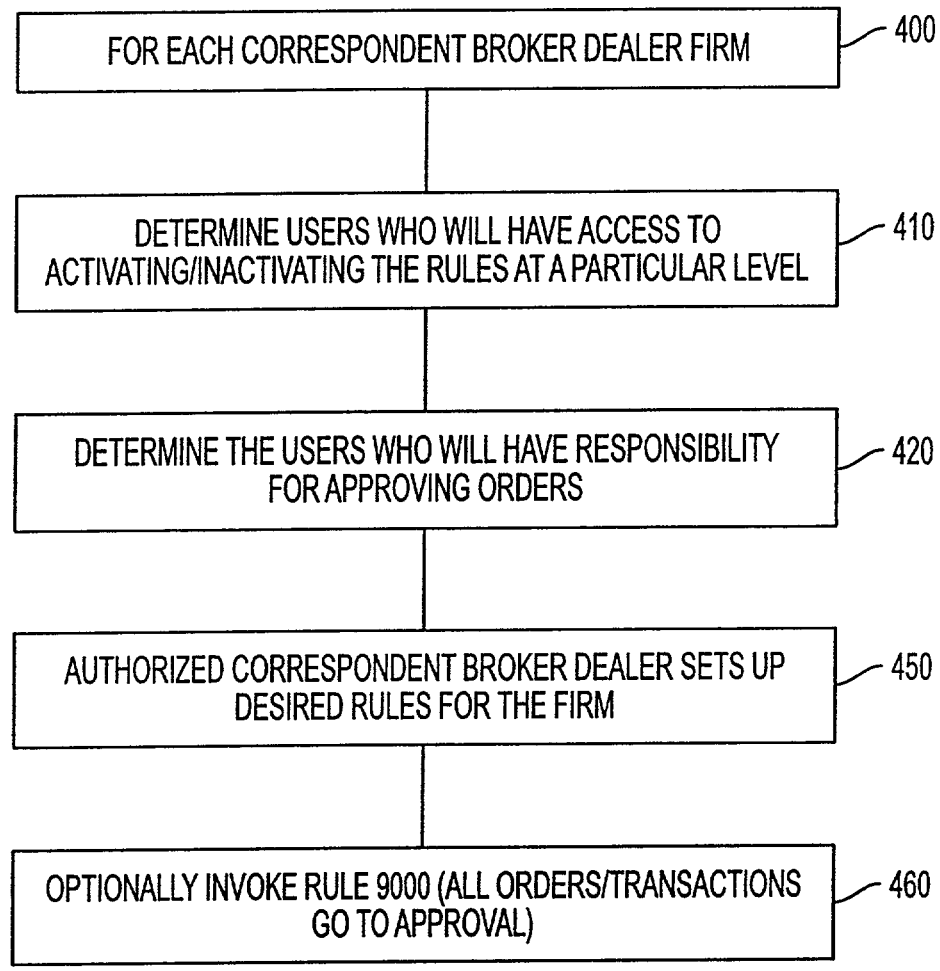
FIG. 4 is a flow chart of a process for setting up the rules engine of FIG. 2 in accordance with one aspect of the invention.

FIG. 4 is a flow chart of a process for setting up the rules engine of FIG. 2 in accordance with one aspect of the invention. For each broker-dealer (400), one determines what users will have access to the ability to activate and inactivate the rules (410) at particular levels. One also determines the users who will be responsible for approving orders (420). A particular user, authorized by the corresponding broker-dealer firm, sets up the desired rules for the firm/office/registered reps/accounts (450). Optionally, one may invoke Rule 9000 for a particular period of time which directs all orders and transactions to the approval desk of the new broker-dealer firm to ensure that the system is operating as intended.

Figure 5:
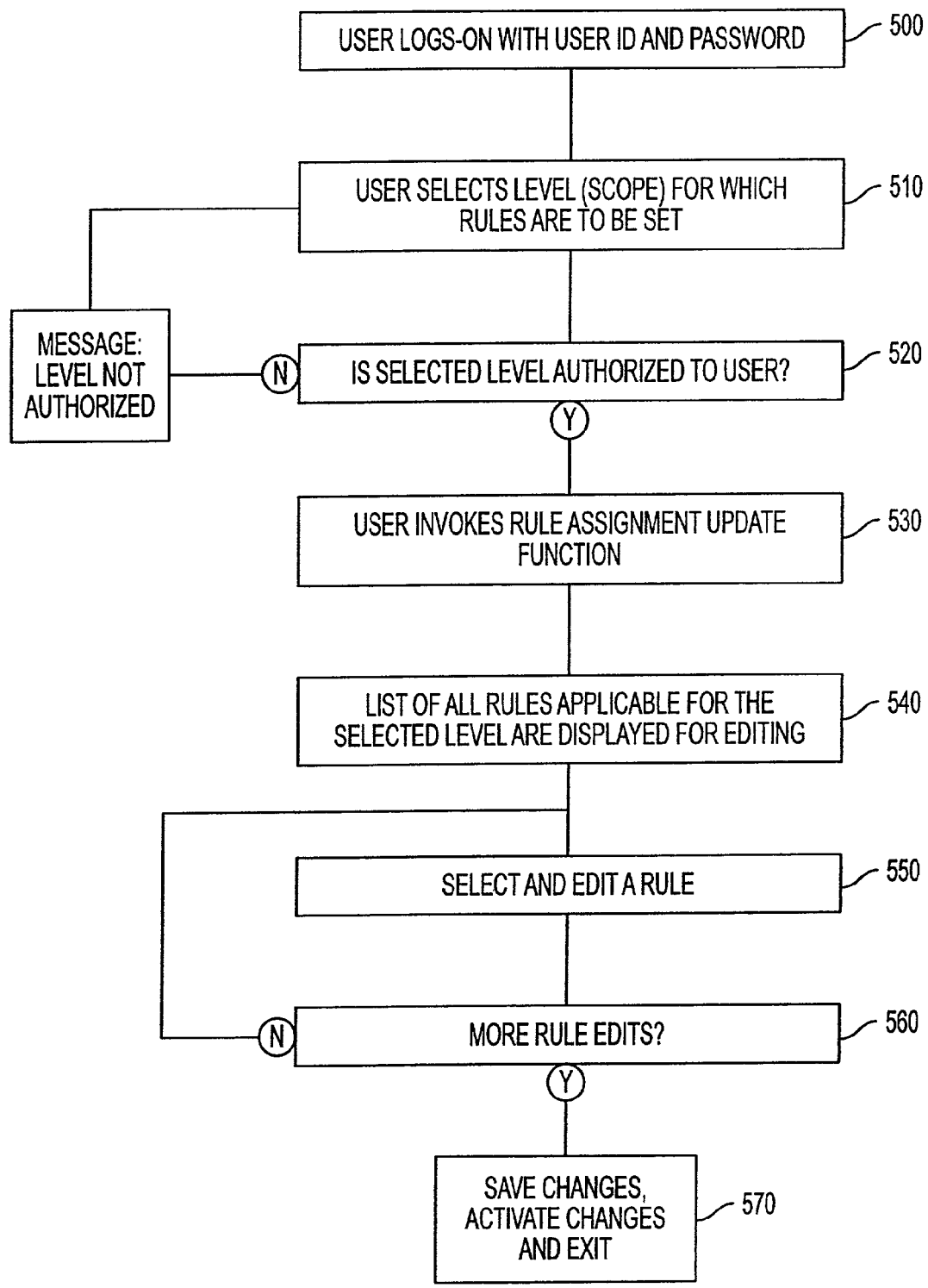
FIG. 5 is a flow chart of a rules assignment update process.

FIG. 5 is a flow chart of a rules assignment update process. In this process, a user logs in with user ID and password (500). Typically, this user will be a compliance manager for a correspondent broker-dealer firm. The user selects a particular level (510) at which rules are to be set. A check is made to determine whether or not the user is authorized to set rules at that level (520). If the user is not (520-N), a message is displayed indicating the user is not authorized access at that level and the process returns to before step 510. If the level is appropriate for that user (520-Y), the user invokes the assignment update function (530). A list of all rules applicable for the selected level are displayed for editing (540). A user selects a particular rule and edits it (550). If the user desires to edit more rules (560-Y), the user proceeds to do that (550). If the user is done editing rules (560-N), the changes are saved to the rules (570), the rules become immediately operational and the process exits.

Exemplary edits that a user might apply to a rules set would be to enable the rule by entering an indicator such as "Y" within the assigned field of the field or to disable a rule by entering "N" in that Field. In addition, one can set rule parameters or edit them and one may set or edit the outcomes of a particular rule. A parameter field receives the indication "Y" for example, when parameters are to be associated with a particular rule that permits a drop down screen to be activated which will enable entry of the parameters associated with determining a rule is satisfied or violated. Parameters can be edited, if the parameters where previously established using the same drop down screen.

Although not all users are authorized to make changes to rules, a read only version of the rules assignment update process shown in FIG. 5, called a rules assignment list function, is similar but lacks the capability to update the rules.

FIG. 6 is an exemplary rules assignment definition screen. In the particular screen, in the fields labeled "ACT" (i.e. activated), the character "P" indicates that this is a mandatory system wide rule which cannot be modified without global system administrator privileges. The character "Y" indicates that it is an optional rule which has been activated. If a rule is inherited, such as when one is viewing rule assignment definitions for a particular registered representative and a firm wide rule is in effect, the inherited field will be labeled "Y" by virtue of having been activated at a higher level. An entry "N" would indicate that the corresponding inherited rule is not active at that level. The outcome field has been discussed previously. The rule number and the rule description have been discussed previously, the field "PARM IND" indicates whether or not parameters are associated with the rule.

Rules may also be set on an exception basis. For example, if one wanted to impose a rule on all registered representatives in a particular broker-dealer firm, one could impose the rule, excepting out any one or more particular registered representative from application of the rule.

It may be desirable to have separate system administrators for each broker-dealer firm with reduced security access over that which would be held by a global system administrator.

FIG. 7 is an exemplary rule code definition screen. If one desires to define a new rule for the system, and assuming one is authorized to activate new rules, such as a system administrator, one would utilize this screen to activate the particular rule and set any applicable parameters.

FIG. 8 is an exemplary parameter screen for a rule generated by the screen shown in FIG. 6. If the new rule has an indication that parameters are available (PARM IND=Y), the screen of FIG. 8 drops down to allow the particular parameters to be populated or edited.

Figure 9:
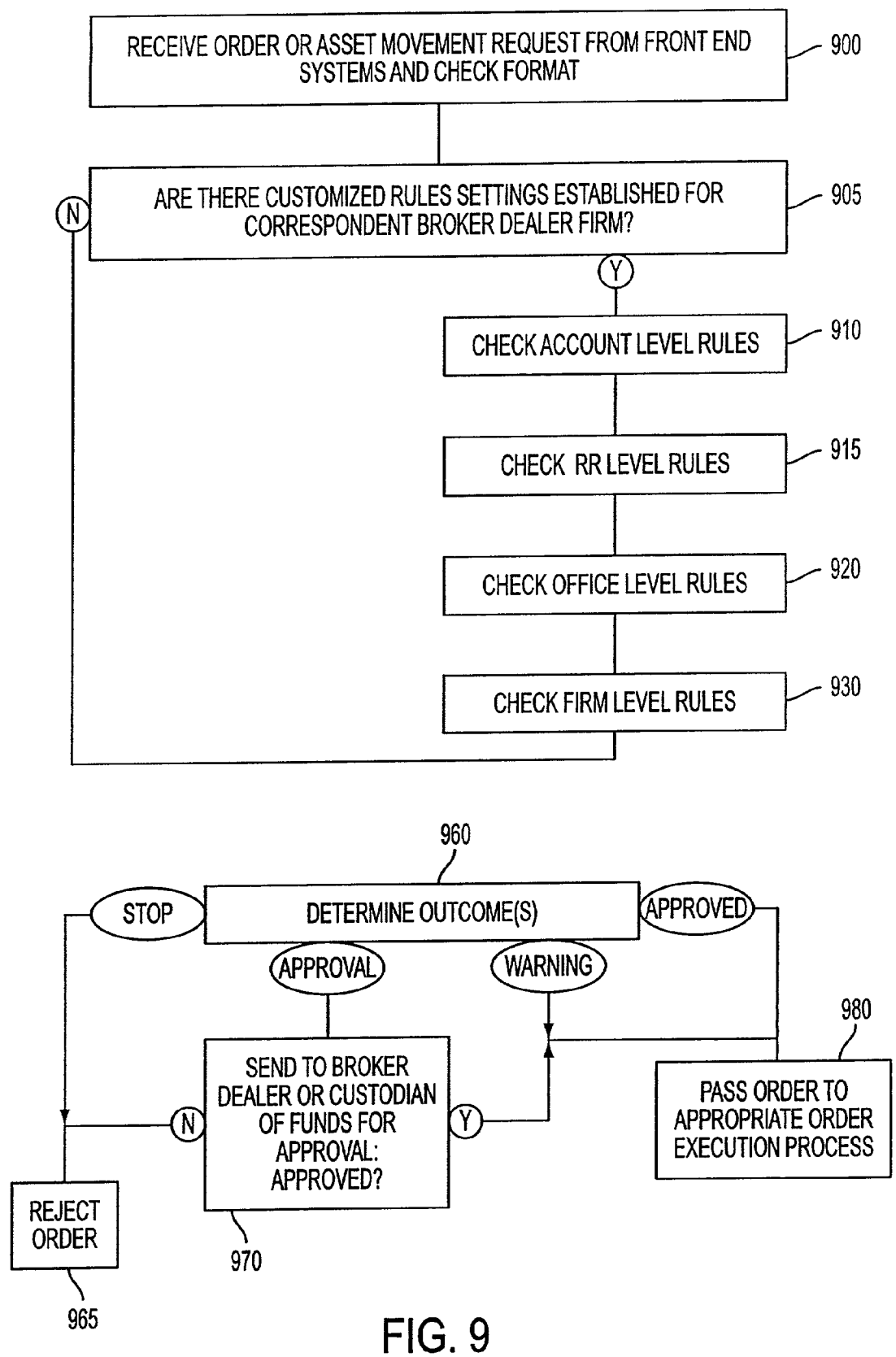
FIG. 9 is a flow chart of an exemplary process for rule processing in accordance with one aspect of the invention.

FIG. 9 is a flow chart of an exemplary process for rule processing in accordance with one aspect of the invention. Orders are received from one or more front end systems and are checked for basic format (900). A check is made to see if customized rule settings are in effect for the corresponding broker-dealer firm (905). If they are (905-Y), the rules engine would check the account level rules or the account range to see if the account level rules are satisfied (910). Then it checks rules associated with the registered representative (915), rules for the particular office from which the order originates (970) and the firm level rules (including system level rules and compliance rules) applicable to the broker-dealer firm (930). Once all of the outcomes from all of the checks (910-930) are determined, the outcomes are reviewed to determine the appropriate action to be taken (960). If the outcome is stop (960-stop), the order is rejected (965) upfront with the applicable message(s) for the rule(s) violated. If the outcome is warning (960-warning), the order is sent to the appropriate order execution process and a message is sent to the broker-dealer firm with the warning. If the outcome is approval (960-approval), the order is sent to the corresponding broker-dealer firm for approval along with a message as to the specific rules violated. If it is approved (970-Y) by the broker-dealer firm, the order is forwarded to the appropriate order execution process for fulfillment (980). If the order does not come back approved from the broker-dealer firm, it is assumed that the order was rejected by the broker-dealer firm. If the outcome is approved (960-approved), the order is passed to the appropriate order execution process (980).

In some embodiments, the AMPS system 165 operates slightly differently. Since the broker-dealer may not be the custodian of the funds, the request to transfer funds is either stopped upfront or sent to a designated person at the custodian of the funds for approval, rather than sent for approval to the broker-dealer firm from which the request to transfer funds originates.

The broker-dealer firms have the ability to customize the messages returned in response to a rules violation to suit their particular preferences.

Although the present invention has been described and illustrated in detail, it is clearly understood that the same is by way of illustration and example only and is not to be taken by way of limitation.

What is claimed is:

1. A rules engine computer system, comprising:
a) an interface configured to receive a plurality of transactions, each transaction containing a request either (1) for an order to be sent to a market for execution or (2) for execution of an asset transfer from an account; and
b) a non-transitory storage medium having rules stored thereon, the rules being configured to determine whether or not to allow execution of a requested order or asset transfer, the rules having parameters configured to analyze the requested order or asset transfer and a plurality of preset levels of scope of application, wherein:
each rule has an assigned level of scope of application selected from the plurality of preset levels,
each preset level of scope of application specifies a scope of source of transactions for which a corresponding rule should apply to all transactions from any source within the specified scope, and
the assigned level corresponding to each rule is adjustable from a first one of the plurality of preset levels to a second one of the plurality of preset levels based on a user setting; and
c) an order/transaction processing section having access to the storage medium, the order/transaction processing section configured to apply at least one of the rules to each respective received transaction based on source and level of the respective received transaction being within the specified scope of each applied rule, to determine whether or not to allow execution of the requested order or asset transfer contained in the respective received transaction, wherein:
upon determining to automatically approve execution of the requested order or asset transfer contained in a first received transaction, based on application of at least one of the rules to the request for the order or asset transfer in the first received transaction, the order/transaction processing section forwards the order or the asset transfer in the request contained in the first received transaction to an execution process for fulfillment; and
upon the application of at least one of the rules to a second received transaction indicating a manual user approval is required for execution of the order or asset transfer, in the request contained in a second received transaction, the order/transaction processing section forwards the request for the order or asset transfer contained in the second received transaction to a user for possible manual approval for execution for fulfillment.

2. The rules engine computer system of claim 1, in which the assigned level of scope of application of an applied rule specifies a specific account.

3. The rules engine computer system of claim 1, in which the assigned level of scope of application of an applied rule specifies a specific registered representative.

4. The rules engine computer system of claim 1, in which the assigned level of scope of application of an applied rule specifies a specific office.

5. The rules engine computer system of claim 1, in which the assigned level of scope of application of an applied rule specifies a specific firm.

6. The rules engine computer system of claim 1, in which the assigned level of scope of application of an applied rule is set to the global level.

7. The rules engine computer system of claim 1, in which an applied rule is accompanied by a message to be sent when the applied rule is violated.

8. The rules engine computer system of claim 7, in which the text of said message can be changed by a user for a selected level.

9. The rules engine computer system of claim 1, wherein upon the application of at least one of the rules to a third transaction indicating a warning:
the order/transaction processing section forwards the requested order or asset transfer contained in the third received transaction to an execution process for fulfillment; and
the order/transaction processing section sends a warning message regarding the third transaction to a broker/dealer.

10. The rules engine computer system of claim 1, wherein upon determining not to send for execution the order or asset transfer, in the request contained in a third received transaction, based on application of at least one of the rules to the request for the order or asset transfer in the third received transaction, the order/transaction processing section stops processing of the request contained in the third received transaction without execution of the requested order or asset transfer.

11. A rules engine computer system, comprising:
a) an interface configured to receive a plurality of transactions, each transaction containing a request either (1) for an order to be sent to a market for execution or (2) for execution of an asset transfer from an account; and
b) a non-transitory storage medium having rules stored thereon, the rules being configured to determine whether or not to allow execution of a requested order or asset transfer, the rules having parameters configured to analyze the requested order or asset transfer and a plurality of preset levels of scope of application, wherein:
  each rule includes an assigned level of scope of application selected from a plurality of preset levels;
  each preset level of scope of application specifies a scope of source of transactions for which a corresponding rule should apply to all transactions from any source within the specified scope;
  the assigned level is adjustable from a first one of the plurality of preset levels to a second one of the plurality of preset levels based on a user setting;
  each rule has an assigned outcome selected from a plurality of preset outcomes; and
  the assigned outcome is adjustable from a first one of the plurality of preset outcomes to a second one of the plurality of preset outcomes based on user setting; and
c) an order/transaction processing section having access to the storage medium, the order/transaction processing section configured to apply at least one of the rules to each respective received transaction based on source and level of the respective received transaction being within the specified scope assigned to each applied rule, to determine whether or not to allow execution of the requested order or asset transfer contained in the respective received transaction, wherein:
  upon determining to automatically approve execution of the requested order or asset transfer contained in a first received transaction, based on application of at least one of the rules to the request for the order or asset transfer in the first received transaction resulting in an automatic approval outcome, the order/transaction processing section forwards the order or asset transfer in the request contained in the first received transaction to an execution process for fulfillment; and
  upon the application of at least one of the rules to a second received transaction resulting in an outcome indicating a manual user approval is required for execution of the order or asset transfer, in the request contained in a second received transaction, the order/transaction processing section forwards the request for the order or asset transfer contained in the second received transaction to a user for possible manual approval for execution for fulfillment.

12. The rules engine computer system of claim 11, in which the assigned level of scope of application of an applied rule specifies a specific account.

13. The rules engine computer system of claim 11, in which the assigned level of scope of application of an applied rule specifies a specific registered representative.

14. The rules engine computer system of claim 11, in which the assigned level of scope of application of an applied rule specifies a specific office.

15. The rules engine computer system of claim 11, in which the assigned level of scope of application of an applied rule specifies a specific firm.

16. The rules engine computer system of claim 11, in which the assigned level of scope of application of an applied rule is set to the global level.

17. The rules engine computer system of claim 11, in which an applied rule is accompanied by a message to be sent when the applied rule is violated.

18. The rules engine computer system of claim 17, in which the text of said message can be changed by a user for a selected level.

19. The rules engine computer system of claim 11, wherein upon the application of at least one of the rules to a third transaction indicating a warning outcome:
  the order/transaction processing section forwards the requested order or asset transfer contained in the third received transaction to an execution process for fulfillment; and
  the order/transaction processing section sends a warning message regarding the third transaction to a broker/dealer.

20. The rules engine computer system of claim 11, wherein upon the application of at least one of the rules to a third received transaction indicating a stop execution outcome, based on application of at least one of the rules to the request for the order or asset transfer in the third received transaction, the order/transaction processing section stops processing of the request contained in the third received transaction without execution of the requested order or asset transfer.

* * * * *